US006778360B2

United States Patent
Gillis et al.

(10) Patent No.: US 6,778,360 B2
(45) Date of Patent: Aug. 17, 2004

(54) ELECTROSTATIC DISCHARGE DEVICE IN A DISK DRIVE PROVIDING A CONDUCTIVE PATH BETWEEN A SLIDER AND THE DISK DRIVE HOUSING THEREBY PROTECTING AGAINST ELECTROSTATIC DISCHARGE

(75) Inventors: Donald R. Gillis, San Jose, CA (US); Mike Suk, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 165 days.

(21) Appl. No.: 10/121,559

(22) Filed: Apr. 11, 2002

(65) Prior Publication Data

US 2003/0193748 A1 Oct. 16, 2003

(51) Int. Cl.[7] ............................. G11B 5/60; G11B 5/54
(52) U.S. Cl. .................. 360/234.5; 360/254.7
(58) Field of Search .......................... 360/254.2, 255.9, 360/245.8, 246, 234.5

(56) References Cited

U.S. PATENT DOCUMENTS 4,761,699 A * 8/1988 Ainslie et al. ........... 360/234.5

* cited by examiner

Primary Examiner—A. J. Heinz
(74) Attorney, Agent, or Firm—Lewis L. Nunnelley

(57) ABSTRACT

A conductive path is provided to discharge electrostatic charges from a slider in a magnetic disk drive directly to the housing of the disk drive. In one embodiment conductive fibers electrically connect the slider with the housing. In another embodiment a cantilevered conductive finger electrically connects the slider with the housing. By providing a discharge path the accumulation of potentially damaging electrostatic charges is prevented.

14 Claims, 5 Drawing Sheets

ELECTROSTATIC DISCHARGE DEVICE IN A DISK DRIVE PROVIDING A CONDUCTIVE PATH BETWEEN A SLIDER AND THE DISK DRIVE HOUSING THEREBY PROTECTING AGAINST ELECTROSTATIC DISCHARGE

BACKGROUND OF THE INVENTION

1. Field of the Invention

This invention relates in general to disk drives used for information storage in a computer, and more specifically to a device allowing electrostatic discharge of the slider within the disk drive.

2. Description of the Background Art

Disk drives using magnetic recording of digital information are used to store most of the information in contemporary computer systems. A disk drive typically has a housing with at least one rotatable magnetic disk having a plurality of concentric tracks of magnetically stored data. There is at least one recording head typically with a separate write element and read element for writing and reading data on the tracks. The recording head is constructed on a slider and the slider is attached to a suspension. The suspension is connected to an actuator which positions the recording head over a specific track of interest. The actuator first rotates to seek the track of interest and after positioning the recording head over that track maintains the recording head in close registration to that track.

The slider carrying the recording head has a disk facing surface upon which an air bearing is constructed. The purpose of the air bearing is to allow the slider to float on a cushion of air over the rotating disk and to be positioned close to the disk surface. Alternatively the disk facing surface of the slider may be designed to be in contact with the disk.

There is an advantage in designing the suspension to lift the slider away from the disk surface when the disk rotation is stopped. The disk surface may be very smooth thus enabling higher recording densities without the risk of encountering stiction between the slider and the disk. Accordingly some conventional disk drives have a plastic load/unload fixture having a base portion and a ramp portion attached to the disk drive housing. In addition, in these disk drives there is a tab on the suspension designed to engage the ramp portion of the load/unload fixture. In the prior art the entire load/unload fixture is formed from an insulating material.

To achieve very high recording density, the recording head must be very small. Unfortunately very small recording heads are subject to damage from electrostatic discharge. This is particularly true of the read element in the recording head. The smaller the read element, the greater the damage from a given amount of electrical discharge. Static electrical charge may accumulate on the slider from either van deGraff charging resulting from close proximity to the moving disk or tribological charging. In the past, partially conductive epoxy has been used to attach the slider to the metallic suspension. The resistance of the epoxy connection can vary substantially thus in some disk drives there is a residual amount of charge on the slider which can then discharge through the read element to the disk causing damage to the read element. Furthermore, the suspension usually does present an ideal conductive path to the housing because the electrical connection is through a bearing assembly which has only intermittent conduction. Thus, the discharge path between the slider and the disk drive housing is uncertain and indirect. The problem of electrical discharge causing damage to the read sensor is exacerbated with ever decreasing sizes of the read sensor.

From the foregoing it is apparent that an apparatus offering improved and safe static discharge of sliders is needed.

SUMMARY OF THE INVENTION

In a preferred embodiment, the invention provides for a conduction path directly from the slider to the housing of the disk drive.

In one embodiment, one or more conductive fibers are configured to provide an electrical discharge path between the slider and the disk drive housing. The conductive fibers can conveniently be permanently connected electrically to a conducting portion of the load/unload ramp which is connected to the housing and can be configured to touch the slider when it is unloaded from the disk surface. In an alternate embodiment a low force conductive cantilevered finger is permanently connected electrically to the housing and is used to touch the slider.

An embodiment of an electrical discharge device according to the present invention substantially reduces the risk of read element damage. Other aspects and advantages of the present invention will become apparent from the following detailed description which when taken in conjunction with the accompanying drawings illustrate by example the principles of the invention.

DETAILED DESCRIPTION OF THE INVENTION

An embodiment of the present invention provides a direct conductive path between the slider in a disk drive and the housing of the disk drive. This conductive path prevents dangerous electrostatic charges from accumulating on the slider and causing damage by discharging through the recording head.

In the Figures to follow, features are labeled with a three digit reference number. The first digit refers to the specific Figure. The latter two digits refer to the specific features. Features common to more than one Figure have the same latter two digits in the reference number.

Figure 1:
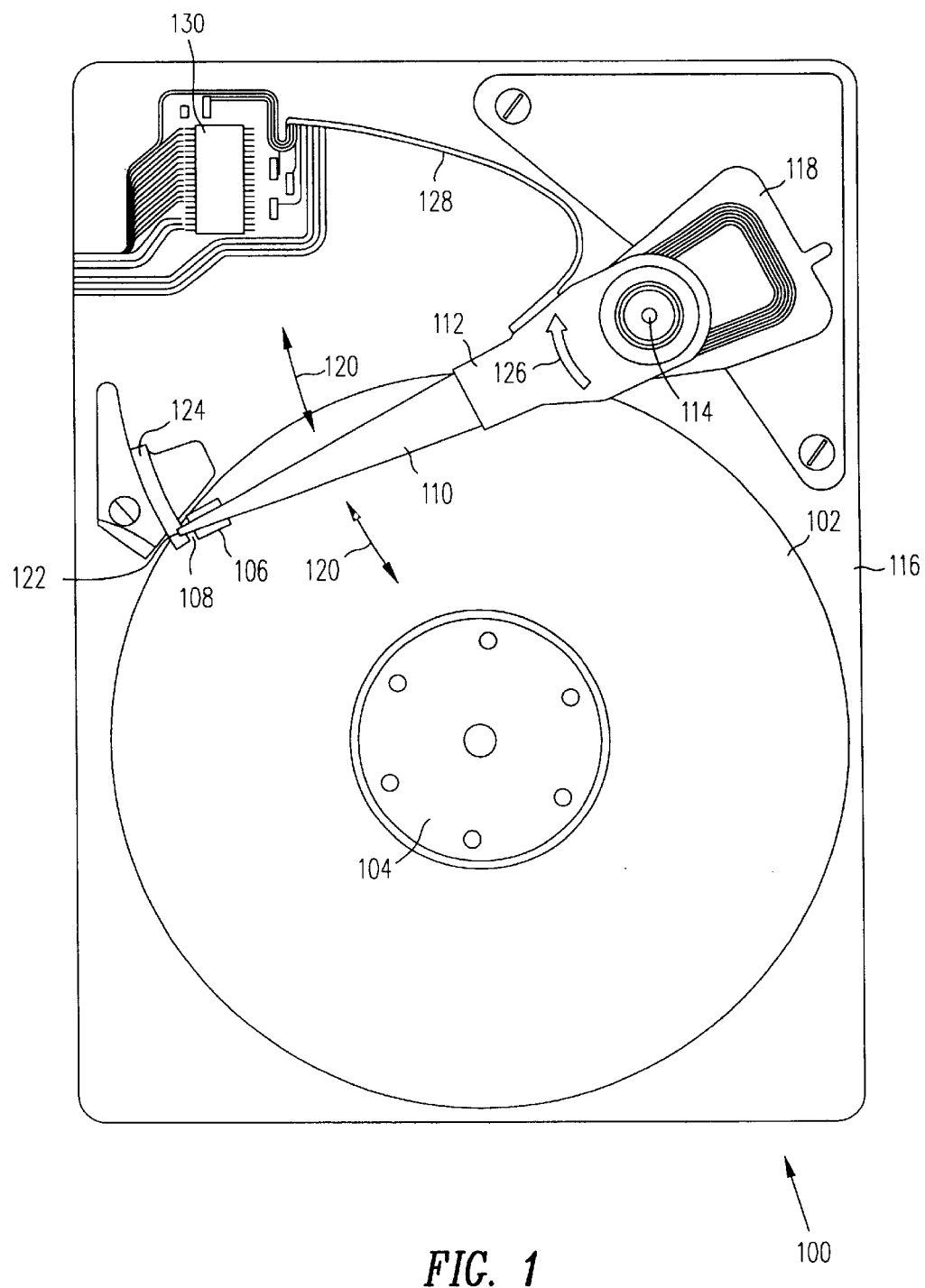
FIG. 1 illustrates a disk drive having a load/unload fixture.

Referring to FIG. 1, a magnetic disk drive 100 has at least one rotatable magnetic disk 102 supported by a spindle 104 and rotated by a motor (not shown). There is at least one slider 106 with an attached recording head 108 positioned over the disk 102 surface while reading and writing. The slider 106 is attached to a suspension 110 with partially conductive epoxy (not shown) and the suspension 110 is attached to an actuator 112. The actuator 112 is pivotally attached 114 to the housing 116 of the disk drive 100 and is driven by a voice coil motor 118. As the disk 102 is rotating, the slider 106 along with the suspension 110 is positioned by the actuator 112 radially or along an arcuate path 120 over the disk 102 surface to access the data track of interest.

Typically during operation of the disk drive 100, the motion of the rotating disk 102 relative to the slider 106 generates an air bearing between the slider 106 and the disk 102 surface which exerts an upward force on the slider 106. This force is balanced by a spring force from the suspension 110 urging the slider 106 toward the surface of the disk 102. Alternatively, the slider 106 may be in either partial or continuous contact with the disk 102 surface during operation.

FIG. 1 also shows a load/unload tab 122 on the distal end of the suspension 110. This load/unload tab 122 operates in conjunction with a load/unload fixture 124 to lift the slider 106 away from the disk 102 surface when the disk drive 100 is turned off or goes into a power saving mode. When an unload operation is initiated, the actuator 112 rotates far enough in a clockwise direction 126 such that the load/unload tab 122 engages with the load/unload fixture 124. The load/unload tab 122 then slides up the load/unload fixture 124 gently lifting the slider 106 off of the disk 102 surface. FIG. 1 also shows the electrical connection 128 as wires or a flex cable between the recording head 108 and the preamplifier 130.

Figure 2A:
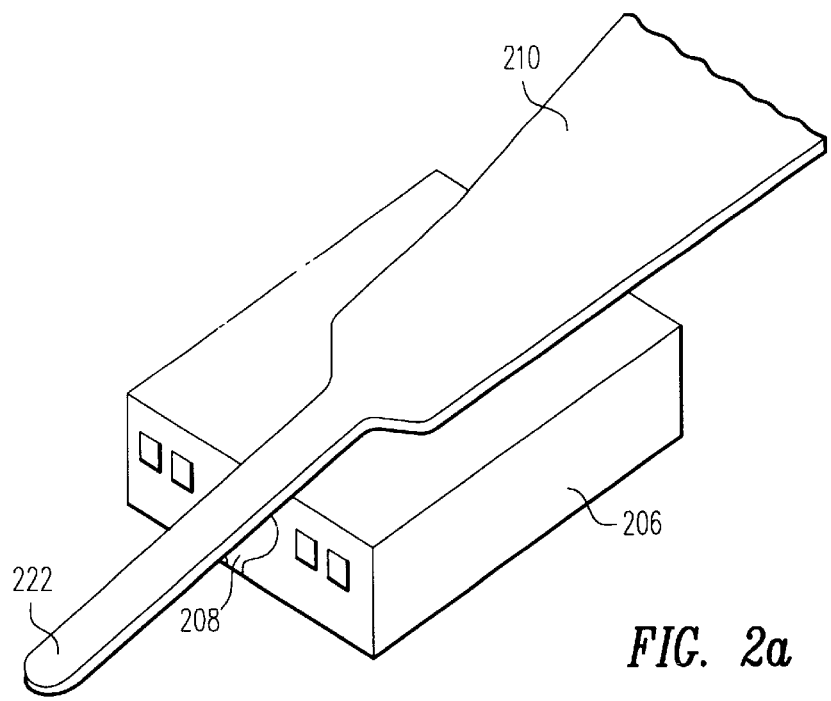
FIG. 2a illustrates a detailed perspective view of a slider and a portion of a suspension.
Figure 2B:
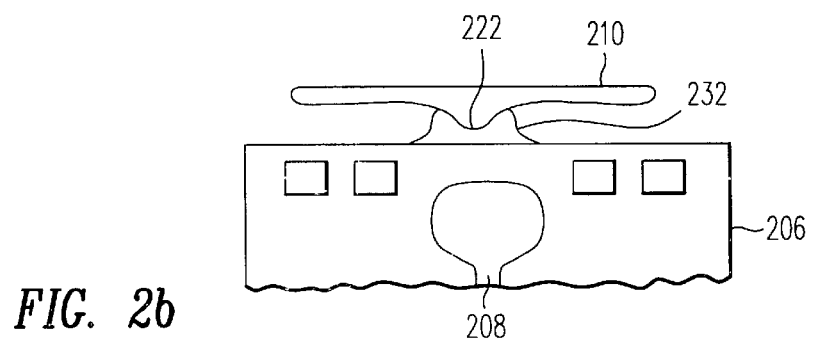
FIG. 2b illustrates an end view of a slider.
Figure 2C:
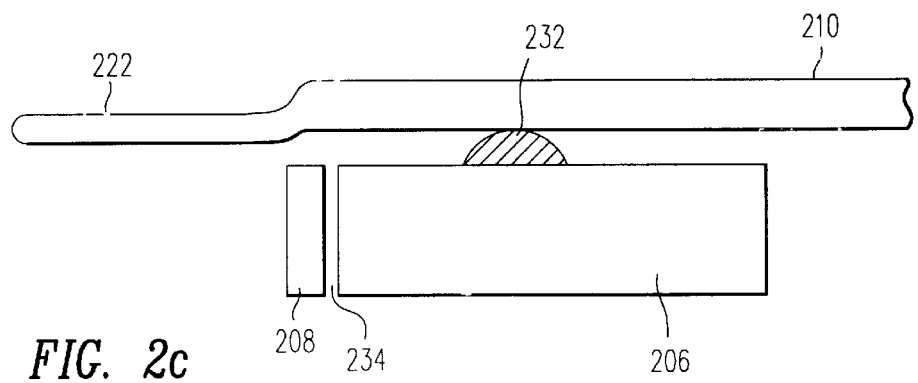
FIG. 2c illustrates a side view of a slider.

FIG. 2a shows a more detailed perspective view of the slider 206 and a portion of the suspension 210. The recording head 208 is shown on the trailing surface of the slider 206. The load/unload tab 222 on the suspension 210 is illustrated. FIG. 2b shows an end view of the slider 206. In FIG. 2b the location of the partially conductive epoxy 232 between the slider and the suspension is illustrated. FIG. 2c shows a side view of the slider 206, the suspension 210, the load/unload tab 222, and the partially conductive epoxy 232. FIG. 2c also shows that the recording head 208 is separated from the slider 206 by a thin layer of insulating material 234 such as alumina. One discharge path for electrostatic charge on the slider 206 is across the thin layer of insulating material 234 and through the recording head 208. In addition to damaging the recording head 208, electrostatic discharge can also go through the electrical connection 128 and damage the preamplifier 130.

Figure 3A:
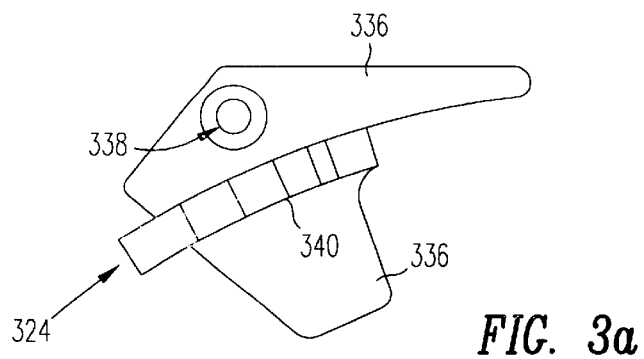
FIG. 3a illustrates a top view of a load/unload fixture.
Figure 3B:
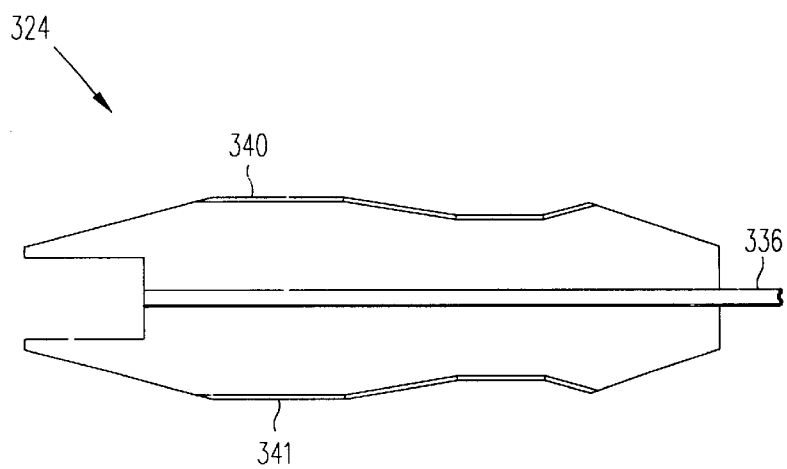
FIG. 3b illustrates a side view of a load/unload fixture.
Figure 3C:
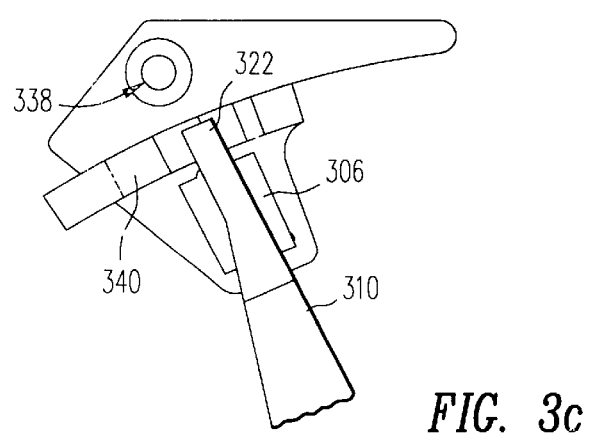
FIG. 3c illustrates a top view of a load/unload fixture and an unloaded slider.

FIG. 3a shows a top view of the main features of a load/unload fixture 324. The term "load/unload fixture" refers to the entire structure shown in FIG. 3a. The load/unload fixture has a ramp portion 340 and a base portion 336. There is also typically a hole 338 through which the load/unload ramp may be attached to the disk drive housing 116 by means such as a screw or registration pin. FIG. 3b shows a side view of the load/unload fixture 324. Generally, there is a recording head for each surface of a disk. Accordingly, the side view of the load/unload fixture shown in FIG. 3b illustrates a dual load/unload fixture wherein the top ramp 340 is used for the recording head on the top surface of the disk (not shown) and the bottom ramp 341 is used for the recording head on the bottom surface of the disk (not shown). The top ramp 340 and bottom ramp 341 share a common base portion 336. FIG. 3c shows a top view of a suspension 310 with an unloaded slider 306 on the load/unload fixture 324. The load/unload tab 322 of the suspension 310 is shown in FIG. 3c as engaged with the ramp 340 of the load/unload fixture 324.

Figure 4A:
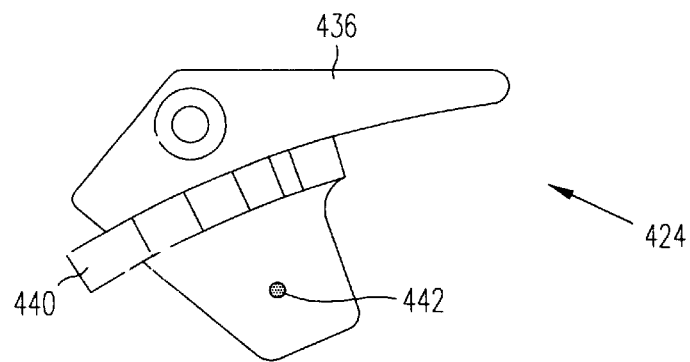
FIG. 4a illustrates a top view of a load/unload fixture according to a first embodiment of the invention.

FIG. 4a illustrates one embodiment of the present invention. The base portion 436 is formed from a suitable conductor such as aluminum or aluminum alloy. The base portion 436 is attached directly to the disk drive housing 116 and therefore presents a very low resistance electrical path to the disk drive housing 116. The ramp 440 is conveniently formed from a suitable plastic material such as teflon, nylon or other suitable material which permits sliding of the tab on the surface of the ramp without wear damage or creation of particulate debris. The ramp 440 is joined with the conductive base portion 436 by an appropriate means such as swaging, gluing, or the like. One or more conductive fibers 442 is attached to or imbedded in the base portion 436 of the load/unload fixture 424. The fibers 442 stick up from the surface of the base so that they contact the slider as the tab is moved onto the ramp 440. The conductive fibers 442 may conveniently be connected to or imbedded into the base portion 436 by means such as press fitting or clamping. Each conductive fiber 442 may conveniently be formed from any resilient conductive material such as carbon impregnated nylon or a thin metal wire such as copper. The number of fibers in the bundle is preferably chosen to limit the overall force on the slider to approximately 100 dynes or lower to prevent any alteration of the alignment of the slider relative to the suspension. The number of fibers can be as low as one as long as the fiber provides a direct electrical discharge path between the slider and the base portion of the load/unload fixture and hence to the disk drive housing.

Figure 4B:
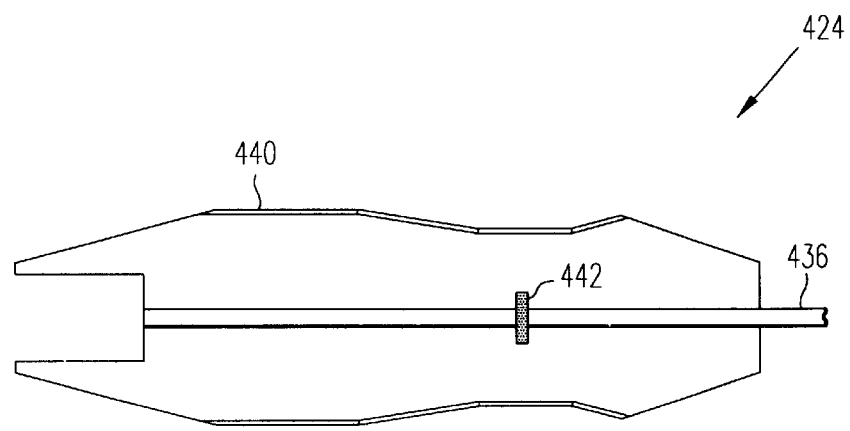
FIG. 4b illustrates a side view of a load/unload fixture according to a first embodiment of the invention.
Figure 4C:
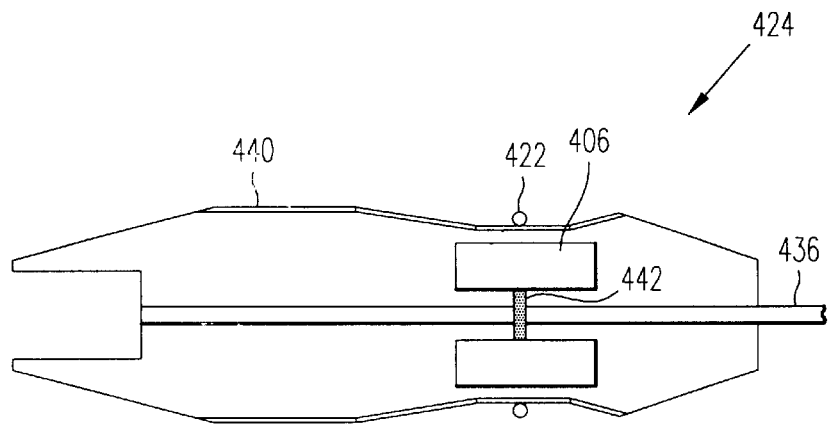
FIG. 4c illustrates a side view of a load/unload fixture along and unloaded sliders according to a first embodiment of the invention.

A view of the cross section of the load/unload fixture having a bundle of one or more conductive fibers is illustrated in FIG. 4b. FIG. 4c shows a cross sectional view of the load/unload fixture 424 having a bundle of one or more conductive fibers 442 in contact with a slider 406. The load/unload tab 422 of the suspension is shown on the ramp portion 440 of the load/unload fixture 424.

Figure 5A:
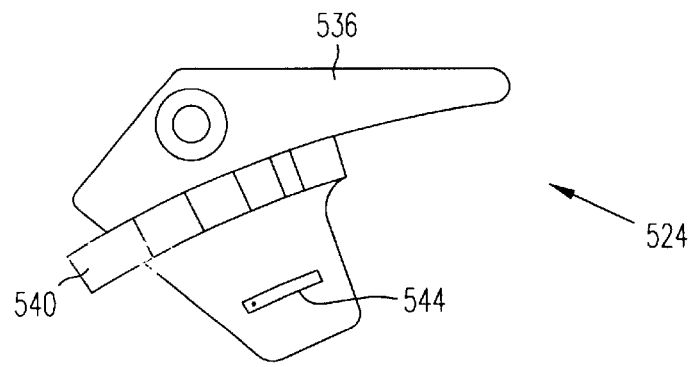
FIG. 5a illustrates a top view of a load/unload fixture according to a second embodiment of the invention.
Figure 5B:
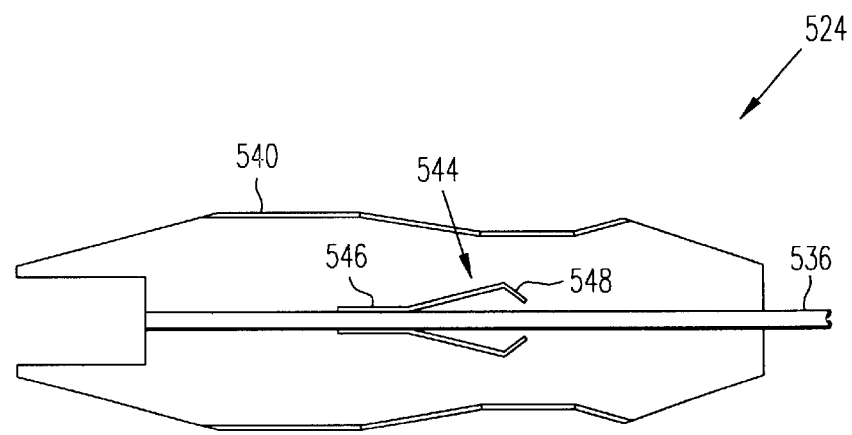
FIG. 5b illustrates a side view of a load/unload fixture according to a second embodiment of the invention; and, FIG. 5c illustrates a side view of a load/unload fixture along with unloaded sliders according to a second embodiment of the invention.
Figure 5C:
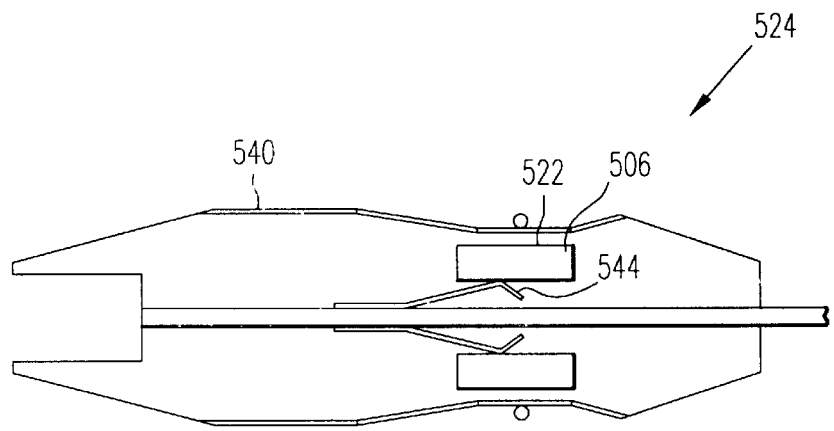

An alternative embodiment of the invention is illustrated in FIGS. 5a, 5b, and 5c. FIG. 5a illustrates a top view of a load/unload fixture 524 which has a conductive base portion 536 and a ramp portion 540. In addition, there is a cantilevered conductive finger 544 which is attached to the base portion 536 by convenient means such as spot welding, swaging, screwing, and riveting. The conductive finger may be conveniently formed from a metal such as copper, or copper alloy. The force of contact on the slider is preferably about 100 dynes or lower. The conductive finger may also be formed from a conductive polymer. FIG. 5b illustrates a side view of the load/unload fixture 524. The cantilevered conductive finger 544 is attached at one end 546 to the base portion 536 of the load/unload fixture 524. The other end 548 of the conductive finger 544 extends upward from the base portion 536 and is able to touch the slider 506 when present thus providing a direct conductive path for electrical discharge between the slider 506 and the disk drive housing 116. FIG. 5c illustrates a side view of the load/unload fixture 524 with the cantilevered conductive finger 544 when a slider 506 is present.

From the foregoing it will be appreciated that the embodiments of the electrostatic discharge devices provided by the invention prevent potentially damaging accumulations of electrostatic charge on the slider. The devices provided by the invention are effective, inexpensive, and easy to implement. A discharge path embodying the invention is much more effective in discharging the slider body compared with using only partially conductive epoxy between the slider and the suspension. Although specific embodiments of the invention have been described and illustrated here, the invention is not to be limited to the specific forms or configurations so described and illustrated. The invention is limited only by the claims.

We claim:

1. A disk drive, comprising:
   a housing;
   a disk rotatably connected to said housing;
   a slider;
   a suspension connected with said slider, said suspension having a load/unload tab;
   a load/unload fixture for loading and unloading said slider onto and off of said disk; and,
   a conductive path directly between said slider and said housing, wherein said conductive path is provided by a cantilevered conductive finger electrically connecting said slider with said housing.

2. A disk drive as in claim 1 wherein said cantilevered conductive finger exerts a force on said slider of 100 dynes or less.

3. A disk drive, comprising:
   a housing;
   a disk rotatably connected to said housing;
   a slider;
   a suspension connected with said slider, said suspension having a load/unload tab;
   a load/unload fixture for loading and unloading said slider onto and off of said disk; and,
   a conductive path directly between said slider and said housing, wherein said conductive path is provided by one or more electrically conducting fibers between said slider with said housing.

4. A disk drive as in claim 3 wherein said one or more conducting fibers exerts a force on said slider of 100 dynes or less.

5. A disk drive, comprising:
   a housing;
   a disk rotatably connected to said housing;
   a slider;
   a suspension connected with said slider, said suspension having a load/unload tab;
   a load/unload fixture for loading and unloading said slider onto and off of said disk, wherein said load/unload fixture has a conductive base portion electrically connected to said housing; and,
   a conductive path directly between said slider and said conductive base portion.

6. A disk drive as in claim 5 wherein said conductive path is provided by a cantilevered conductive finger electrically connecting said slider with said conductive base portion.

7. A disk drive as in claim 6 wherein said cantilevered conductive finger exerts a force on said slider of 100 dynes or less.

8. A disk drive as in claim 5 wherein said conductive path is provided by one or more electrically connecting fibers between said slider with said conductive base portion.

9. A disk drive as in claim 8 wherein said one or more conducting fibers exerts a force on said slider of 100 dynes or less.

10. A disk drive, comprising:
    a housing;
    a disk rotatably connected to said housing;
    a slider;
    a suspension connected with said slider, said suspension having a load/unload tab;
    a load/unload fixture for loading and unloading said slider onto and off of said disk, wherein said load/unload fixture has a conductive base portion electrically connected to said housing; and,
    an electrically conductive extension extending from said conductive base portion to a position where said conductive extension will contact said slider when said slider is unloaded from said disk.

11. A disk drive as in claim 10 wherein said electrically conductive extension is provided by a cantilevered conductive finger.

12. A disk drive as in claim 11 wherein said cantilevered conductive finger exerts a force on said slider of 100 dynes or less.

13. A disk drive as in claim 10 wherein said electrically conductive extension is provided by one or more electrically conducting fibers.

14. A disk drive as in claim 13 wherein said one or more conducting fibers exerts a force on said slider of 100 dynes or less.

* * * * *